Nov. 14, 1939.  H. R. MOULTON  2,180,015
DIAGNOSTIC INSTRUMENT
Filed June 17, 1936
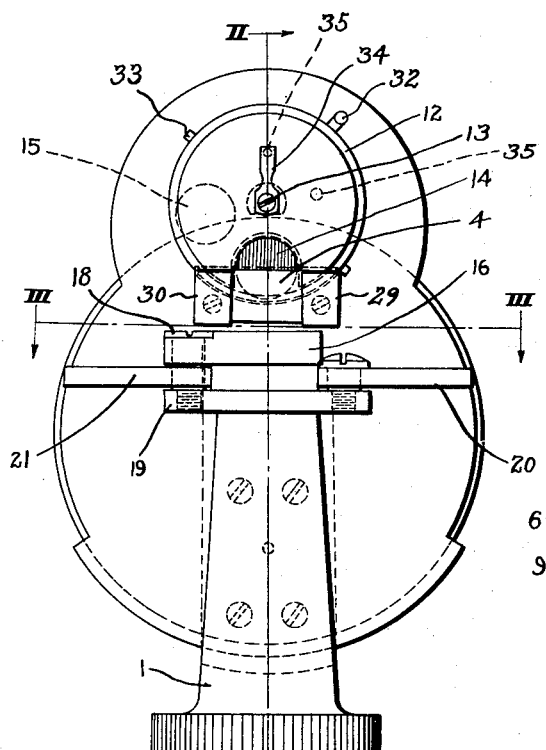
FIG. I
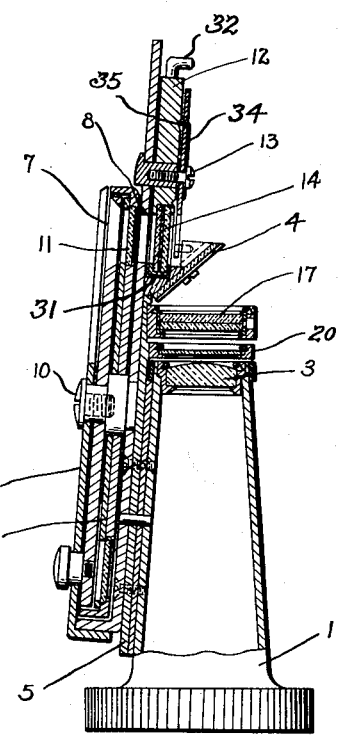
FIG. II
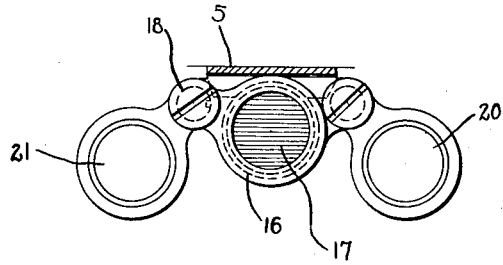
FIG. III
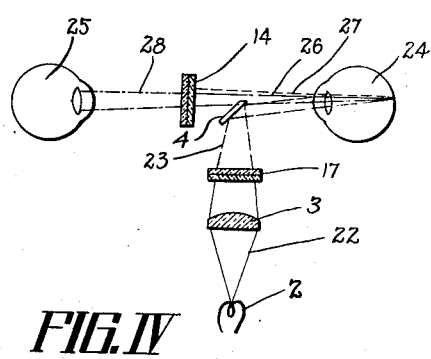
FIG. IV
INVENTOR
HAROLD R. MOULTON
BY
Harry H. Styll.
ATTORNEY Patented Nov. 14, 1939

2,180,015

UNITED STATES PATENT OFFICE 2,180,015

DIAGNOSTIC INSTRUMENT

Harold R. Moulton, Southbridge, Mass., assignor to American Optical Company, Southbridge, Mass., a voluntary association of Massachusetts Application June 17, 1936, Serial No. 85,702

5 Claims. (Cl. 88—22)

This invention relates to improvements in diagnostic instruments of the type utilizing a projected beam of light for diagnostic purposes and has particular reference to improved means and method of increasing the quality and clarity of image of the means under examination.

One of the principal objects of the invention is to provide novel means for use in combination with an instrument of the above character for eliminating annoying and undesired reflections during the use of the instrument.

Another object is to so relate the axis of polarization with the projected light rays as to obtain the greatest possible intensity of illumination for diagnostic purposes and to so associate polarizing means with the light rays emerging from the eye so that said light rays will be visible to the examiner and other rays such as corneal reflections will be eliminated from the vision of the examiner.

Another object is to utilize sheet material having light polarizing means oriented therein or thereon so as to produce polarizing means which will accomplish the above described results.

Another object is to provide means of the above character in the form of attachments which may be attached to diagnostic instruments for use as the occasion may arise.

Another object is to provide means in combination with an instrument of the above character whereby the light rays projected into the eye under examination will be polarized when entering the eye and depolarized when emerging from the eye and means positioned between the eye of the examiner and the eye under examination adapted to receive and permit visibility of said depolarized light rays by the examiner and to eliminate from said depolarized rays undesired reflected and still polarized rays such as corneal reflections or other undesired reflections or glare spots from the cornea of the eye during the examination.

Another object is to provide simple, efficient and economical means and method of reducing annoying light reflections during the use of diagnostic instruments of the above character.

Other objects and advantages of the invention will become apparent from the following description taken in connection with the accompanying drawing, and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred forms only have been shown by way of illustration.

Referring to the drawing:

Fig. I is a face view of a diagnostic instrument head embodying the invention;

Fig. II is a sectional view taken on line II—II of Fig. I;

Fig. III is a fragmentary sectional view taken on line III—III of Fig. I; and

Fig. IV is a diagrammatic view illustrating the function of the means embodying the invention.

Instruments of the type having self-contained illumination and means for projecting a beam of light into the eye under examination for diagnostic purposes are not new in the art but there have been certain defects with instruments of the above character in that a portion of the projected light rays is reflected by the cornea of the eye and produces a visible and annoying spot of light during the eye examination. This spot of light which is generally known as corneal reflections is caused mainly by the light which is reflected by the corneal surface of the eye.

Several devices and methods for reducing such light spots or glare have been utilized, in the past, such as focusing systems, pin holes in discs, slides, etc., but none of such devices would entirely eliminate the glare. As far as I am aware, there has been no means hitherto available, other than cumbersome and expensive means which are limited in aperture and of a fragile nature which will substantially entirely eliminate said light spots or other annoying reflections.

It, therefore, is one of the primary objects of this invention to provide simple, light, non-shatterable, and economical means and method of substantially entirely eliminating such spots of light or other annoying reflections during the use of instruments of this character.

Referring more particularly to the drawing the device embodying the invention comprises a tubular light passageway I through which the light rays from a suitable source of illumination 2 are projected by the lens system 3 on to a reflector or other suitable light deflecting means 4. The reflector 4 is carried by a support 5 attached to the side of the tubular member I. This support also carries a housing 6 having a sight opening 7 aligned with a similar opening 8 formed in the support 5. The housing 6 has a disc 9 rotatably mounted therein. The disc is pivotally supported at 10 and has a series of lenses 11 mounted therein for selective alignment with the sight openings 7 and 8. These lenses are of the usual type utilized in testing the eyes.

The support 5 has a disc or plate 12 pivotally attached thereto as indicated at 13. The disc 12 has a sheet of polarizing material 14 mounted therein for movement into and out of alignment with the sight opening. The polarizing material is formed preferably by orienting a plurality of relatively small crystals in cellulose acetate or other suitable composition and allowing said composition to harden in sheet form with said crystals oriented lengthwise in substantially parallel relation with each other. The sheet polarizing unit 14 thus formed has a polarizing nature similar to a single crystal and is preferably assembled between two discs or plates of glass for preservation. The complete structure is integrally united by a suitable adhesive. The disc 12 also has an opening 15 therein which may be rotated into and out of alignment with the sight openings 7 and 8. Sheet polarizing units formed by the above method are relatively inexpensive as compared to other prior art polarizing means and may be made to any desired size, that is, within reasonable limits.

An attachment 16 having a sheet polarizing unit 17 therein of a similar nature to that of the sheet polarizing unit 14 is pivotally attached at 18 to a bracket 19 carried by the tube 1. The attachment may be swung into and out of alignment with the end of the tube as desired (see Fig. III).

In this particular instance, the instrument also has a red free filter 20 and a yellow filter 21 pivotally attached to the bracket 19 in a manner similar to the attachment 16.

In the use of the instrument as shown diagrammatically in Fig. IV, the light rays 22 from the source of illumination 2 pass through the projection lens system 3 and from said lens system into the sheet polarizing unit 17. The light rays 23 emerging from the sheet polarizing unit 17 are plane polarized and are reflected by the light deflecting member 4 in a direction substantially 90° to their original longitudinal direction but with the plane of polarization remaining substantially in the same relation to the longitudinal deflected direction as they were prior to being deflected.

The meridian or plane of polarization is selected so as to obtain the greatest intensity of illumination at the patient's eye, that is, so that the light projected after being passed through said polarizing means and reflected by the light deflecting means will be the brightest possible or substantially the brightest obtainable under such conditions. This is accomplished by rotating the sheet polarizing unit 17 relative to the projected light until the proper meridian is selected. After the position is once located, the polarizing means is fixed in its support and is preferably permanently held in said position. It is apparent that if desired the sheet polarizing unit may be made rotatable in its support 16 so that its plane of polarization may be varied relative to the projected light. The other sheet polarizing unit 14 is positioned in line with the sight opening 8 of the instrument so that during the analysis or examination of the patient's eye 24, the observer's or examiner's eye 25 looks through said sheet polarizing unit. The sheet polarizing unit 14 is so positioned that its axis of polarization is substantially normal to the axis of polarization of the light rays 23 projected into the patient's eye. The object of locating the axis of polarization of the unit 14 in this position is to prevent the light rays 27 reflected by the cornea of the eye under examination and which normally produced annoying reflections or light spots visible to the eye of the examiner, from passing through the sheet polarizing unit.

The light rays 26 emerging from the eye under examination and which are depolarized by the retina of said eye will be visible through the sheet polarizing unit 14 and will be transmitted to the observer's eye as polarized light having all of the annoying corneal reflections, etc., removed therefrom. This enables the examiner or observer to obtain a more clear cut and pronounced image of the interior of the eye.

The reason why the normally annoying corneal reflections may be absorbed by the sheet polarizing unit 14 is due to the fact that the plane of polarization of the reflected light rays 27 is unchanged and when received by the sheet polarizing unit 14 set at right angles to the plane of polarization of said reflected light rays 27, the said rays will be absorbed or extinguished from the visibility of the observer or examiner. The only rays, therefore, which will be visible through the sheet polarizing unit 14, are those that enter the eye 24 and are reflected back by the retina depolarized and/or which emerge from the eye as ordinary light. It, therefore, is apparent that a novel method has been provided whereby the image producing light rays 26 emerging from the interior of the eye may be separated from the undesired polarized rays 27 which are reflected by the cornea or from any other means such as a corrective lens positioned before the eye during the examination thereof. These image forming light rays 26 will emerge from the sheet polarizing unit 14 as plane polarized light rays 28.

This arrangement enables the observer to obtain a clear cut image of the retina and positively eliminates all annoying and undesirable reflections or glare spots during the eye examination.

It is also to be understood that if desired the polarizing unit 14 may be rotatably supported in the disc 12 so that its axis of polarization may be varied as desired. It is, of course, preferable that the polarizing unit 14 be set and maintained in the desired selected meridian.

When not in use the polarizing unit 17 is swung about the pivot 18 out of aligned relation with the light projection tube 1 and the polarizing unit 14 is likewise rotated out of alignment with the sight opening 8. In this particular instance, the opening 15 is placed in alignment with the sight opening.

The instrument head thus described may be utilized with illumination obtained by any suitable source of energy such as from a battery, battery handle or from an electrical line circuit. The intensity of the source of illumination 2 is controlled according to the intensity of illumination desired during the eye examination.

It will be noted that the various attachments containing the red free and yellow filters are pivoted to the bracket 19 so that they may be swung into and out of alignment with the light projection tube 1 as desired. These filters may be used in combination with the polarizing unit 17 or separately thereof as desired.

It will be noted that the polarizing unit 14, in this particular instance, is placed between the reflector or light deflecting means 4 and the disc 9 containing the battery of lenses 11 and that it is located on the patient's side of the instrument or side opposite the observer.

The term "sheet polarizing unit" as used in the specification and claims is intended to denote a polarizing unit formed of a plurality of minute crystals oriented in a supporting composition of cellulose acetate or other suitable means made up in sheet form and having the polarizing crystals oriented therein or thereon in such a manner that each of the minute crystals functions to polarize the light in a given plane in a manner similar to a single crystal. Polarizing means formed as set forth above and which is characterized herein as the sheet polarizing unit 14 or 17, as the case may be, overcomes the difficulty encountered in the past in obtaining polarizing means of a size practical for use, and the cost of which will be very slight as compared with the cost of prior art single polarizing crystals or other means.

It will be noted that the reflector or light deflecting member 4 is supported by two spaced blocks 29 and 30 having slots cut therein to receive the disc 12 to permit rotation thereof about the pivot 13.

The disc 12 is provided with a handle 32 adapted to engage suitable stops such as shown at 33 for positioning the opening 15 and polarizing means 14 alternately in alignment with the sight openings 7 and 8. Spring pressed means 34 having an end adapted to fit within openings 35 formed in the disc 12 are adapted to hold the disc in adjusted position.

From the foregoing description it will be seen that simple, efficient and economical means have been provided whereby annoying light reflections may be eliminated and a clear cut image of the means under observation may be obtained.

It is to be understood that although applicant has shown and described his improved means and method of eliminating undesired light reflections in one particular type of diagnostic instrument such means may be utilized with any diagnostic instrument wherein a beam of light is utilized for observation purposes and this invention is to be broad enough to include such uses. The instrument shown and described herein being only shown by way of illustration.

Having described my invention, I claim:

1. In an instrument of the character described for use with a light source comprising, a light passageway through which light coming from the light source may pass, said light passage-way having a support on one side thereof formed with a sight opening therein, a disc pivotally attached to said support having a series of lenses separately movable into alignment with the sight opening, light deflecting means on said support adjacent the sight opening and in alignment with the light passageway to deflect light coming through said passageway in the direction of the line of sight through the sight opening, a support pivotally attached adjacent the upper end of the light passageway having a disc of sheet-like polarizing means mounted therein for movement into and out of alignment with the light passageway between the light source and the light deflecting means and a second disc pivotally attached to the support and having an opening therein with sheet-like polarizing means mounted in said opening for movement into and out of alignment with the sight opening between the light deflecting means and series of lenses carried by the first disc which is pivotally attached to said support.

2. In an instrument of the character described for use with a source of light, a light passageway through which the light from the light source may pass, a support on said light passageway having a sight opening therein, light deflecting means on said support with a major portion thereof below the center of the sight opening and aligned with the light passageway to deflect the light coming through said light passageway, a disc pivotally attached to the support at one side of the sight opening and having a series of lenses therein alignable with said sight opening and another disc pivotally attached to the support at the opposite side of said sight opening having an opening therein with sheet-like polarizing means movable into and out of alignment with said sight opening by rotation of said second disc and a support pivotally attached adjacent the end of the light passageway having sheet-like polarizing means therein movable into and out of alignment with the said light passageway, the axis of polarization of each of said polarizing means being located substantially perpendicular to each other when in position of use.

3. In an instrument of the character described for use with a light source comprising, a light passage-way through which light coming from the light source may pass, said light passage-way having a support thereon formed with a sight opening, light deflecting means on said support adjacent the sight opening and in alignment with the passage-way to deflect light coming through said passage-way in the direction of the line of sight through said sight opening, a holding member adjustably supported on said instrument adjacent said light passage-way having a piece of relatively thin sheet-like polarizing means mounted thereon for movement into and out of alignment with the light passage-way between the light source and the light deflecting means and a second holding member adjustably mounted on the support having an opening therein with sheet-like polarizing means mounted in said opening for movement into and out of alignment with the sight opening on said support and, when in position of use, lying in a plane intimately related and substantially parallel with the plane of said sight opening to permit the sight opening to be placed in close proximity with the eye of the observer and of a size which will afford a wide unrestricted field of vision through the sight opening and adapted to analyze the polarized rays originating from said polarizing means supported adjacent the passageway and passing through any portion of said analyzer.

4. In an instrument of the character described for use with a source of light, a light passage-way through which the light from the light source may pass, a support on said passage-way having a sight opening therein, a disc pivotally attached to said support having a series of lenses movable into and out of alignment with the said opening, light deflecting means on said support adjacent the sight opening and in alignment with the light passage-way to deflect light coming through said passage-way in a direction of the line of sight through said sight opening, a holding member adjustably supported on said instrument adjacent said light passage-way having relatively thin sheet-like polarizing means adapted to polarize light passing through any portion thereof mounted thereon for movement into and out of alignment with the light passage-way between the light source and the light deflecting means and a second holding member adjustably mounted on the support adjacent the sight opening and having an opening therein with relatively thin sheet-like polarizing means mounted in said opening for movement into and out of alignment with the sight opening in said support and, when in position of use, lying in a plane intimately related and substantially parallel with the plane of said sight opening to permit the sight opening to be placed in close proximity with the eye of the observer and of a size which will afford a wide unrestricted field of vision through the sight opening and adapted to analyze the polarized rays originating from said polarizing means supported adjacent the passageway and passing through any portion of said analyzer.

5. In an instrument of the character described for use with a light source, a light passage-way through which the light from the light source may pass, a support on said light passage-way having a sight opening therein, light deflecting means on said support adjacent the sight opening and in alignment with the light passage-way to deflect the light coming through said light passage-way, a holding member adjustably mounted on said instrument adjacent said sight opening and having relatively thin sheet-like polarizing means thereon movable into and out of alignment with the sight opening and, when in position of use, lying in a plane intimately related and substantially parallel with the plane of said sight opening to permit the sight opening to be placed in close proximity with the eye of the observer and of a size which will afford a wide unrestricted field of vision through the sight opening and adapted to analyze the polarized rays originating from said polarizing means supported adjacent the passage-way and passing through any portion of said analyzer, and a second holding member adjustably supported on said instrument adjacent the light passage-way having relatively thin sheet-like polarizing means adapted to polarize light passing through any portion thereof movable into and out of alignment with said light passage-way, the axes of polarization of each of said polarizing means being disposed in angular relation with each other.

HAROLD R. MOULTON.